(12) United States Patent
Springer

(10) Patent No.: US 12,267,370 B2
(45) Date of Patent: Apr. 1, 2025

(54) USER-PROMPTED GROUP ACTIONS IN A SHARED SPACE

(71) Applicant: Zoom Communications, Inc., San Jose, CA (US)

(72) Inventor: Shane Paul Springer, Manchester, MI (US)

(73) Assignee: Zoom Communications, Inc., San Jose, CA (US)

( * ) Notice: Subject to any disclaimer, the term of this patent is extended or adjusted under 35 U.S.C. 154(b) by 170 days.

(21) Appl. No.: 18/104,150

(22) Filed: Jan. 31, 2023

(65) Prior Publication Data

US 2024/0259440 A1    Aug. 1, 2024

(51) Int. Cl.
*H04L 65/1094* (2022.01)
*H04L 65/403* (2022.01)

(52) U.S. Cl.
CPC ........ *H04L 65/1094* (2022.05); *H04L 65/403* (2013.01); *H04L 65/4046* (2013.01)

(58) Field of Classification Search
CPC .................... H04L 65/403; H04L 65/4046
See application file for complete search history.

(56) References Cited

U.S. PATENT DOCUMENTS 10,284,609 B2 * 5/2019 Malatesha ........... H04L 65/4015
2017/0353508 A1 * 12/2017 Yoakum .............. H04L 65/4038

* cited by examiner

*Primary Examiner* — Nazia Naoreen
(74) *Attorney, Agent, or Firm* — Young Basile Hanlon & MacFarlane, P.C.

(57) ABSTRACT

Methods and systems provide for user-prompted group actions in a shared space hosted by a communication platform. In one embodiment, the system detects, by a processing device within a space, a client device within the space, the client device being associated with a participant of a current communication session; receives, at the processing device, a user input corresponding to the client device, the user input indicating a change in function for the current communication session; correlates, at the processing device, the user input with one or more additional user inputs corresponding to other client devices within the space; and applies the change in function based on the correlation to modify one or more aspects of the communication session.

20 Claims, 6 Drawing Sheets

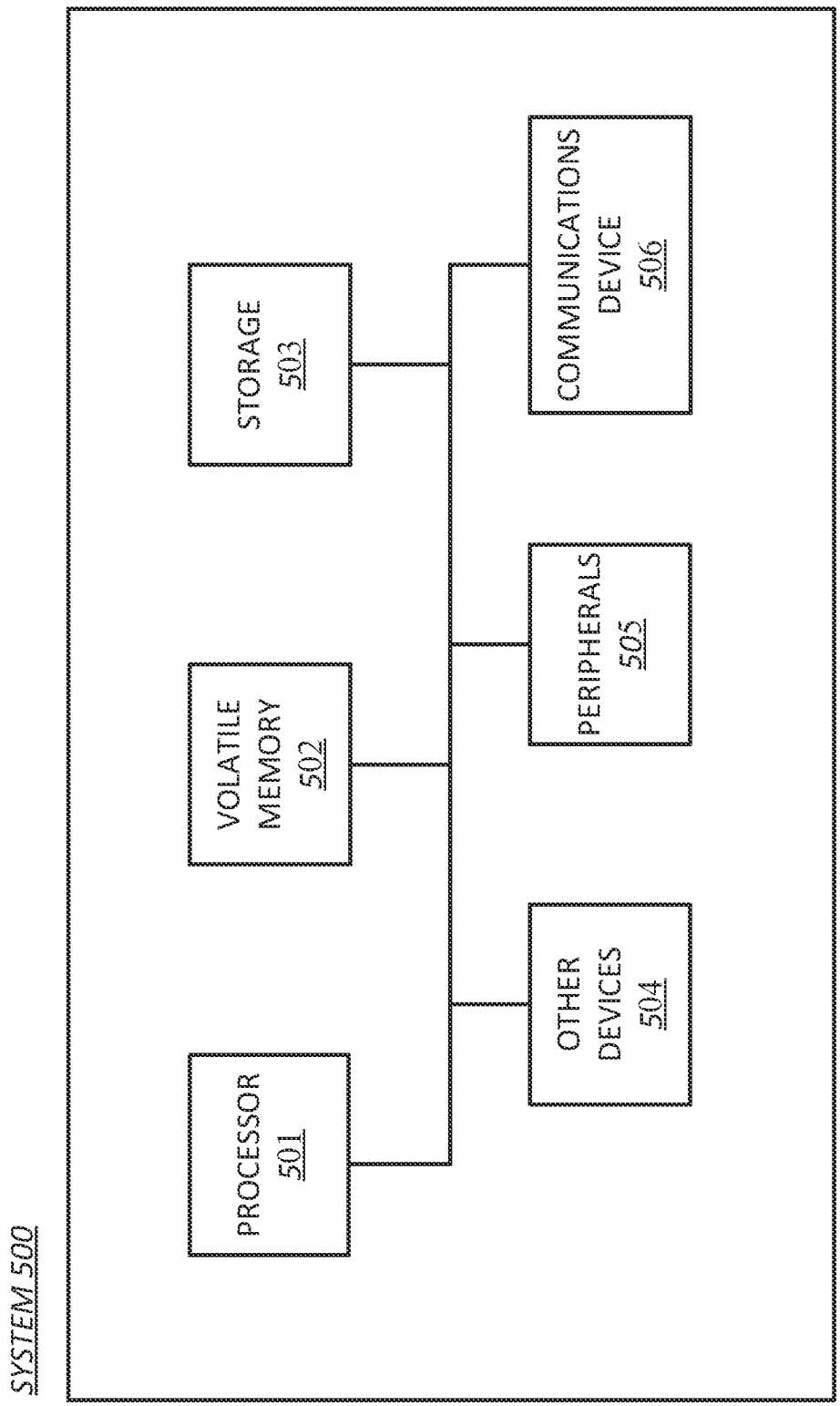

USER-PROMPTED GROUP ACTIONS IN A SHARED SPACE

FIELD OF INVENTION

Various embodiments relate generally to digital communication, and more particularly, to systems and methods providing for user-prompted group actions in a shared space hosted by a communication platform.

SUMMARY

The appended claims may serve as a summary of this application.

BRIEF DESCRIPTION OF THE DRAWINGS

The present invention relates generally to digital communication, and more particularly, to systems and methods providing for user-prompted group actions in a shared space hosted by a communication platform.

The present disclosure will become better understood from the detailed description and the drawings, wherein:

FIG. 5 is a diagram illustrating an exemplary computer that may perform processing in some embodiments.

DETAILED DESCRIPTION

Figure 1A:
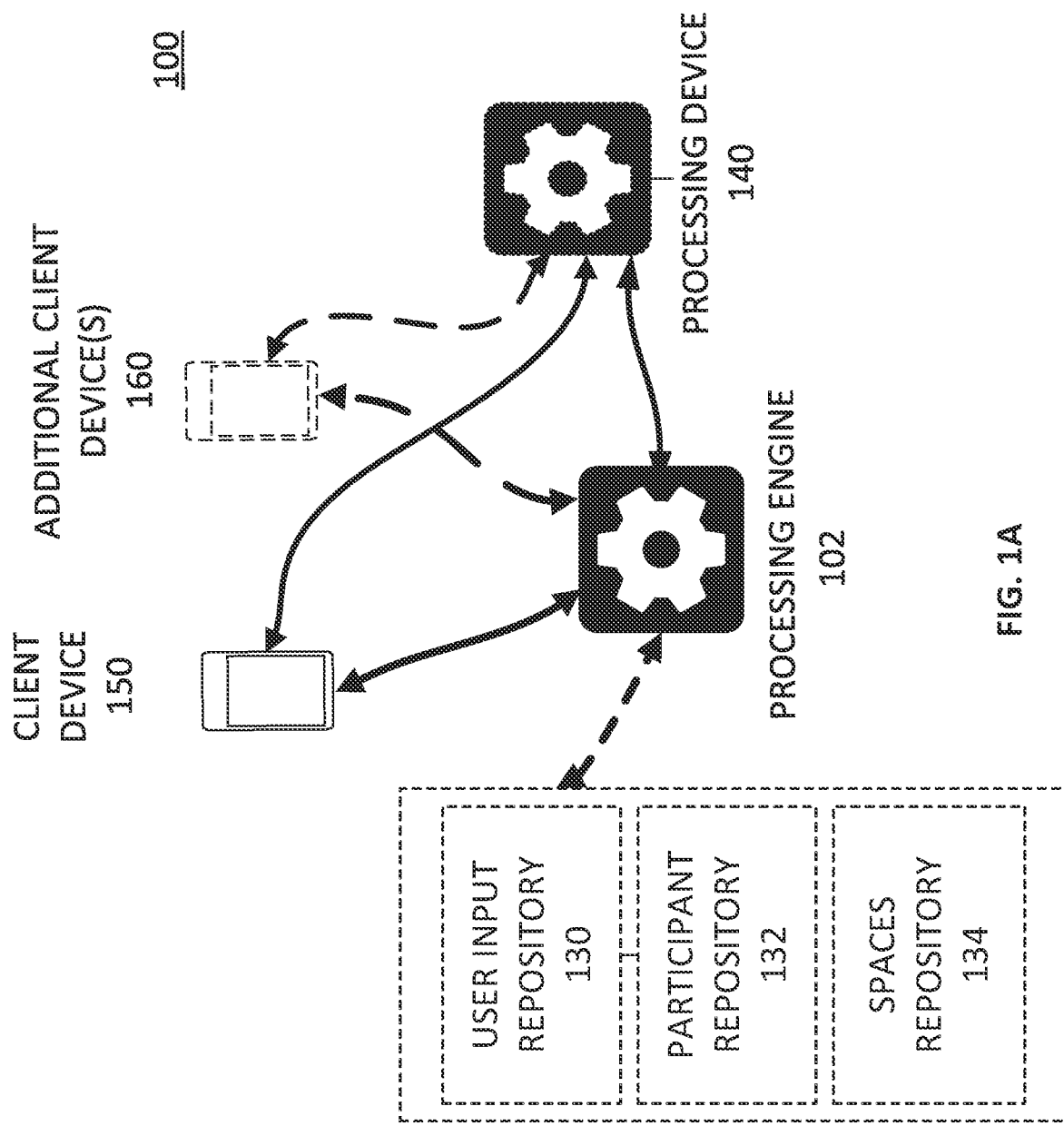
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. Applications for casual friendly conversation ("chat"), work meetings or gatherings, asynchronous work or personal conversation, and more have exploded in popularity. Many allow for participants to enter a conversation using any of a wide variety of devices and allow for switching between different devices in the middle of a conversation. It has also become common for such applications to allow for documents and media (such as images, video, or audio) to be uploaded to a server, where they can then be transmitted to other chat participants.

Digital communication tools and platforms provide applications for hosting communication sessions dedicated to a particular meeting room. Such communication sessions may be accessed by remote attendees ("participants") via their communication platform user accounts. Multiple participants may physically be present in the particular meeting room and view a video stream presented in the particular meeting room. The same video stream may be concurrently sent to the respective computing devices of the user accounts that remotely access the communication session.

In some cases, users inside of a shared space (e.g., a meeting room) may have access to a central processing device or controller within the space. This processing device is configured to be able to adjust various aspects of the communication session while it is in progress, according to various criteria. In some cases, the processing device integrates both physical hardware and software to perform various functions, such as, e.g., launching sessions, scheduling or rescheduling sessions, managing or configuring audio or video hardware within the room such as microphones and webcams, muting one or more participants in the room, and more.

Within spaces that contain such processing devices for sessions, not all users inside the shared space may have access to the processing device, and additionally, may not care to speak or otherwise communicate, because the other methods to interact within the space require too much action. For example, a participant within a conference room among seven other participants may wish to speak. However, the entire room is currently muted for all seven participants, and there is no way for the participant to speak without another user choosing to unmute all 7 participants. The participant therefore chooses to remain silent rather than participate. Such an outcome is undesirable, as all who wish to participate should feel unencumbered to do so without involving other participants, and the usefulness of the communication session suffers when participants choose not to actively participate due to technical obstacles.

Thus, there is a need in the field of digital communication tools and platforms to create a new and useful system and method for user-prompted group actions in shared spaces. The source of the problem, as discovered by the inventors, is a lack of ability to allow participants in shared spaces to engage functions within those shared spaces on an individual basis.

In the above example scenario, the participant within the shared space may be able to simply flip over their phone or other client device, press a button on the lock screen of their phone, or similar. An application on that phone can then send a notification to the processing device for the shared space. The processing device then unmutes all participants of the shared space in response, or unmutes just the microphone that pertains to that one participant. In some cases, the processing device coordinates this participant's intention to change an aspect of the communication session with other participants' intentions, and adjusts or does not adjust aspects of the experience based on coordinating and reconciling these intentions. This solution could extend to various functions within the shared space, and the inputs for conveying participants' intentions could vary from, for example, accelerometer input to button presses to electronic tag interaction and more, depending on different embodiments.

In one embodiment, the system detects, by a processing device within a space, a client device within the space, the client device being associated with a participant of a current communication session; receives, at the processing device, a user input corresponding to the client device, the user input indicating a change in function for the current communication session; correlates, at the processing device, the user input with one or more additional user inputs corresponding to other client devices within the space; and applies the change in function based on the correlation to modify one or more aspects of the communication session.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150, one or more additional client device(s) 160, and a processing device 140 are connected to a processing engine 102 for a communication platform and a processing device 140 for a shared space intended for hosting a communication session maintained by the communication platform. The processing engine 102 is optionally connected to one or more repositories and/or databases. Such repositories and/or databases may include, for example, a user input repository 130, a participant repository 132, and a spaces repository 134. One or more of such repositories may be combined or split into multiple repositories. The client device 150 and additional client device(s) 160 in this environment may be computers, and the processing device 140 and processing engine 102 may be, in whole or in part, applications or software hosted on a computer or multiple computers which are communicatively coupled via remote server or locally.

The exemplary environment 100 is illustrated with only one client device associated with a participant, one additional client device for another participant, one processing engine, and one processing device, though in practice there may be more or fewer additional client devices, processing engines, and/or processing devices. In some embodiments, the client device, additional client device(s), processing engine, and/or processing device may be part of the same computer or device.

Figure 2:
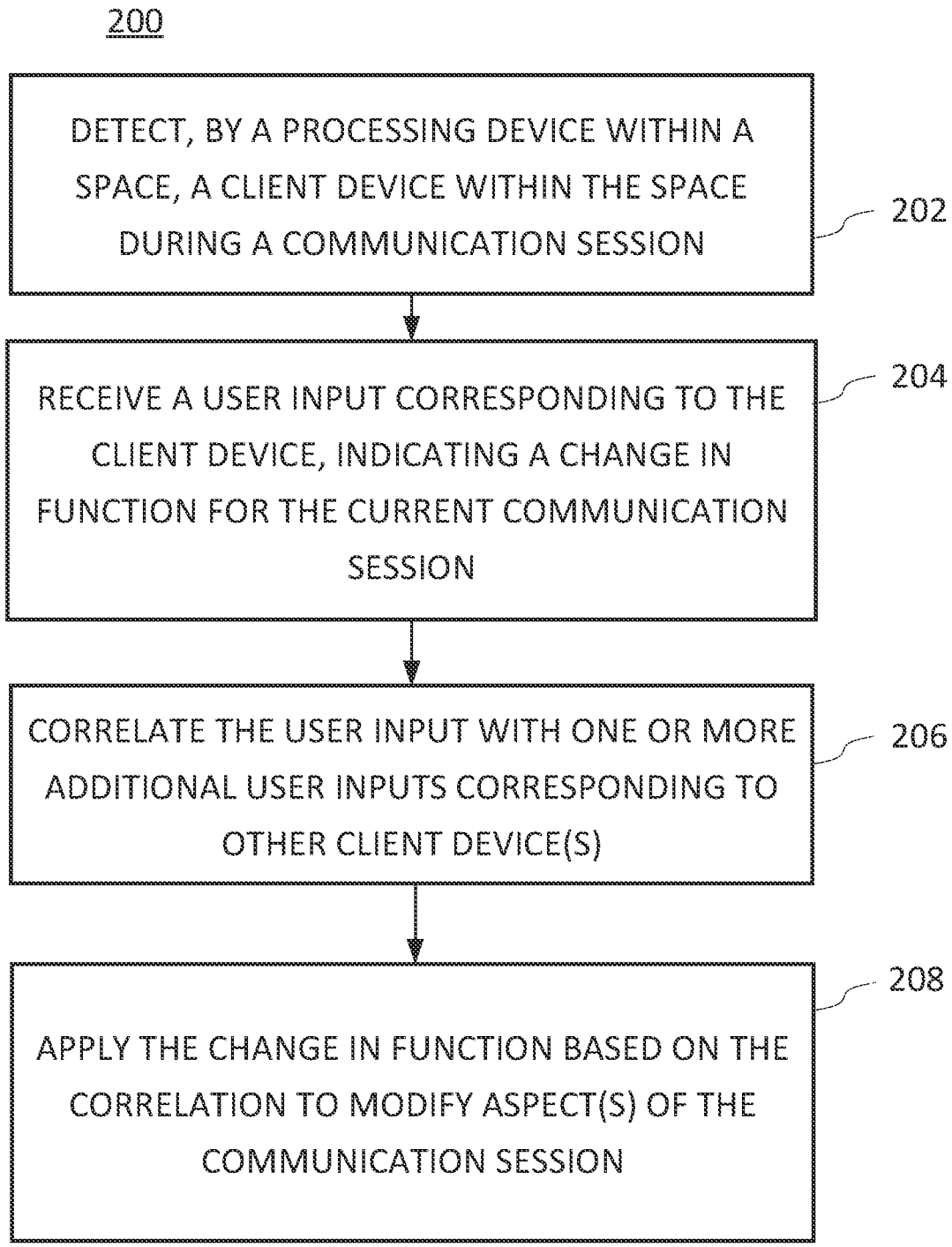
FIG. 2 is a flow chart illustrating an exemplary method that may be performed in some embodiments.

In an embodiment, the processing engine 102 may perform the method 200 (FIG. 2) or other method herein and, as a result, provide for user-prompted group actions in a shared space hosted by a communication platform. In some embodiments, this may be accomplished via communication with the client device, additional client device(s), processing engine 102, processing device 140, and/or other device(s) over a network between the device(s) and an application server or some other network server. In some embodiments, one or both of the processing engine 102 and processing device 140 may be an application, browser extension, or other piece of software hosted on a computer or similar device, or in itself a computer or similar device configured to host an application, browser extension, or other piece of software to perform some of the methods and embodiments herein.

In some embodiments, client device 150, processing device 140 and additional client device(s) 160 may each be devices with a display configured to present information to a user of the device. In some embodiments, the client device 150 and additional client device(s) 160 present information in the form of a user interface (UI) with UI elements or components. In some embodiments, the client device 150, the processing device 140 and receiving client device(s) 160 send and receive signals and/or information to the processing engine 102 pertaining to the communication platform. In some embodiments, client device 150 and additional client device(s) 160 are computer devices capable of hosting and executing one or more applications or other programs capable of sending and/or receiving information. In some embodiments, the client device 150 and/or additional client device(s) 160 may be a computer desktop or laptop, mobile phone, virtual assistant, virtual reality or augmented reality device, wearable, or any other suitable device capable of sending and receiving information. In some embodiments, the processing engine 102 and/or processing device 140 may be hosted in whole or in part as an application or web service executed on the client device 150 and/or additional client device(s) 160. In some embodiments, one or more of the communication platform 140, processing engine 102, and client device 150 or additional client device(s) 160 may be the same device. In some embodiments, the processing device 140 and/or the client device 150 and additional client device(s) 160 are associated with one or more particular user accounts.

In some embodiments, optional repositories function to store and/or maintain, respectively, user inputs corresponding to client devices, the user inputs indicating a change in function for the current communication session 140; participant information for the participants within the shared space; and information on shared spaces where user-prompted group actions may be performed. The optional repositories may also store and/or maintain any other suitable information for the processing engine 102 to perform elements of the methods and systems herein pertaining to the communication platform. In some embodiments, the optional database(s) can be queried by one or more components of system 100 (e.g., by the processing engine 102), and specific stored data in the database(s) can be retrieved.

The communication platform is a platform configured to facilitate communication between two or more parties, such as within a conversation, "chat" (i.e., a chat room or series of public or private chat messages), video conference or meeting, message board or forum, virtual meeting, or other form of digital communication.

Figure 1B:
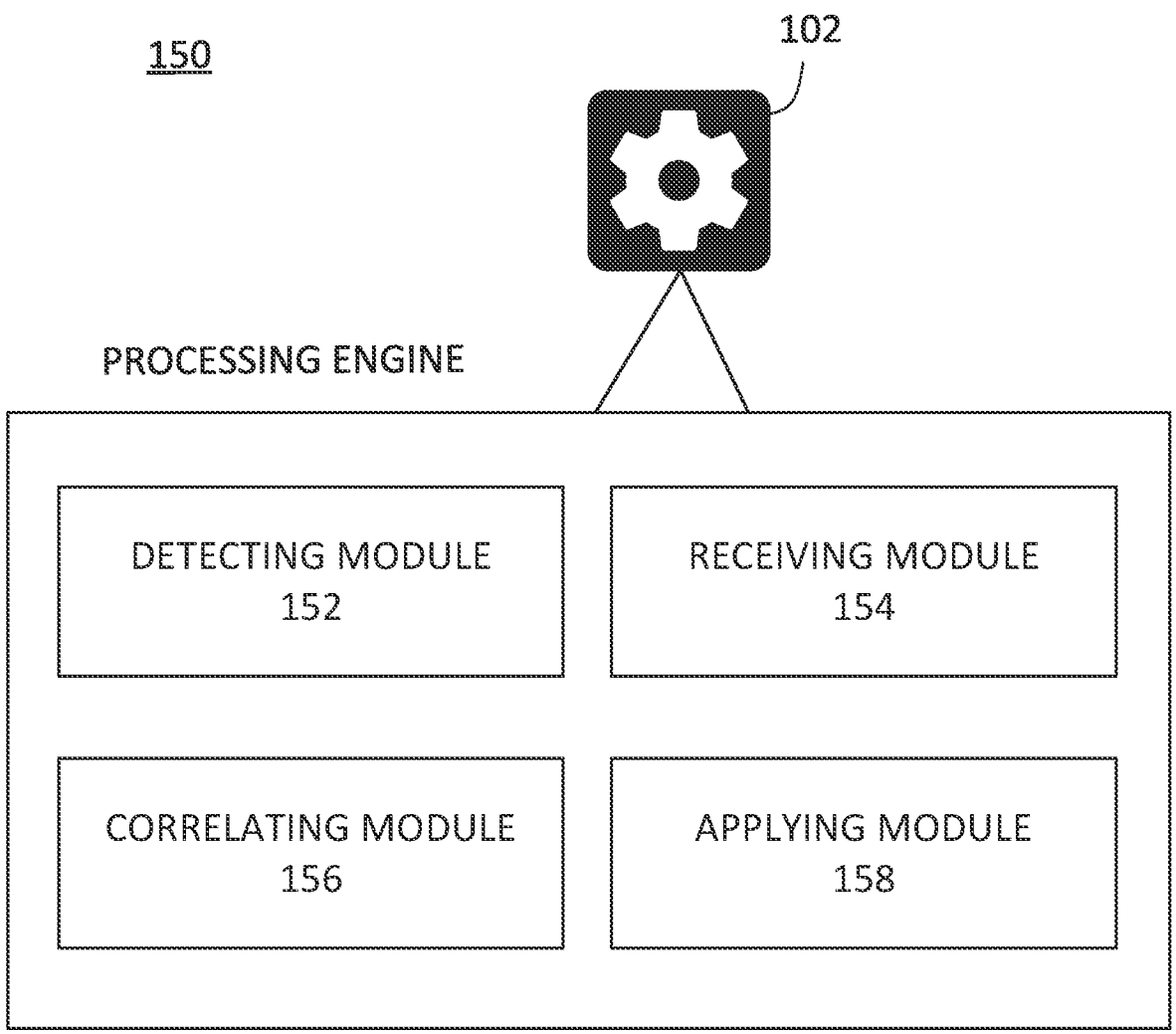
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Detecting module 152 functions to detect, by a processing device within a space, a client device within the space, the client device being associated with a participant of a current communication session.

Receiving module 154 functions to receive, at the processing device, a user input corresponding to the client device, the user input indicating a change in function for the current communication session.

Correlating module 156 functions to correlate, at the processing device, the user input with one or more additional user inputs corresponding to other client devices within the space.

Applying module 158 functions to apply the change in function based on the correlation to modify one or more aspects of the communication session.

FIG. 2A is a flow chart illustrating an exemplary method that may be performed in some embodiments.

At step 202, the system detects, by a processing device within a space, a client device within the space, the client device being associated with a participant of a current communication session.

The space in particular is a shared space that is shared with one or more other participants of the current communication session. For example, if five people are all attending a work meeting to discuss a team project with remote members of the team, then the five people may all gather in the same shared space to hold a conference meeting with those remote members. The shared space may be, for example, a conference room in an office building, a living room or bedroom of a house, a small breakout room or booth, a large warehouse, a trade show floor, or any other potential space that may be shared. In some embodiments, there may be other people within the room who are not participants, while in other embodiments, there is an assumption that all people within the room are participants of the communication session.

In some embodiments, detecting the client device within the space involves detecting, by the processing device within the space, a position of the client device within the space. In some embodiments, the client device may be a phone or similar handheld device belonging to a participant. This other client device may have built-in Global Positioning System ("GPS") technology for transmitting the phone's location to one or more other devices. In some embodiments, such a phone with built-in GPS technology may transmit its location to the processing device within the shared space, which then is able to identify the location of the client device for that participant. In some embodiments, the system may utilize one or more cameras or microphones within the space to identify the positions of participants based on, e.g., their voices, faces, and/or other detectable features. In some embodiments, computer vision, machine learning ("ML"), or similar technology may be utilized for such detection.

In some embodiments, detecting the client device within the space includes determining that the participant associated with the client device is scheduled to attend the communication session. In some embodiments, the processing device within the shared space has access to the calendars of all attending participants to a particular communication session. Such may be the case where, for example, employees of a company have all synced their work calendars to a work scheduling or schedule-tracking system. In various embodiments, such a system may be a built-in part of the communication platform, or may be a third-party integration. In some embodiments, the system can detect that the client device associated with a participant that is marked as "attending" for the communication session is present within the room, and therefore conclude that the participant in question has attended the session.

In some embodiments, the system detects, via the processing device, biometric data of a participant in the space. The system then detects one or more behaviors of the participant within the space based on the biometric data of the participant. Then, based on the one or more behaviors of the participant, the system associates the participant with a particular zone of the space, where the space includes a number of zones. For example, if a participant is present in the space, one of the cameras in the space may detect that he is present based on that participant's known biometric data. In some embodiments, biometric data for recognizing a participant may include one or more of, for example, face recognition, iris recognition, voice or speech recognition, gait recognition, or any other relevant forms of biometric data. In some embodiments, the system or processing device may be capable of recognizing the person despite lacking locational info such as GPS location. The participant may then, for example, raise three fingers, flip their phone over, or perform some other gesture. The system detects, via the processing device, that this action is being performed by the recognized participant. In some embodiments, the processing device can then use a camera within the space to recognize that the action was performed by this particular participant in this particular location of the room. The processing device may then execute a function within the space that the participant signaled by performing the action. If the participant's action was to signal the microphone to be unmuted, for example, and the participant was determined to perform the action in Zone 2 of the space, then the processing device would know to unmute the microphone associated with Zone 2 of the space in order to fulfill the participant's request. Such a user action and executing of a function within the space will be further explored below with respect to the remaining steps of FIG. 2.

At step 204, the system receives, at the processing device, a user input corresponding to the client device, the user input indicating a change in function for the current communication session. In some embodiments, user inputs may be actions, behaviors, or interactions performed by participants. In some embodiments, the user input may be any input which can correspond to the client device in question. For example, the user may press a button that is displayed within a user interface ("UI") on the screen of the client device. A UI for the communication session may be displayed on the screen, with various interactive UI elements. Upon the user clicking on one of the UI elements, the application within the client device may send the user input to the processing device. In some embodiments, the user input indicates some change in the functionality for the current communication session. For example, if the processing device is currently configured to mute everyone in the space (e.g., mute all microphones present in the shared space), then the user input may indicate that one or more microphones should be unmuted. For example, the user input of a participant may indicate that only their microphone should be unmuted, or may indicate that a section within the space should be unmuted, such as a designated Zone 1 or Zone 2 of the space. In some embodiments, the user input may be one of a specified number of default user inputs which are recognized by the system. For example, it may be a recognized gesture to raise one's hand, to flip a client device (e.g., a phone) over, to press an "unmute" button within a control application on their client device, to begin speaking into a microphone, or similar.

In some embodiments, the user input is recognized as a custom user input defined by the participant. In some embodiments, one or more of the participants may be allowed to define their own preferred user inputs or actions. In some embodiments, defining such user inputs may be performed by a participant via an input configuration section of a settings UI, or a similar UI or subsection dedicated to custom definition of user inputs. In some embodiments, the custom definition of user inputs may be saved and stored within the system for later recall. In some embodiments, custom definitions may be configured to be persistent across multiple communication sessions of the communication platform, or such may be the case by default.

In some embodiments, the user input and the additional user inputs are received in response to a notification that includes a polling question. For example, the participants within a shared space of a communication session may be provided, via the screen of their client devices, with a poll question such as, "Do you want to take a break for lunch?" with accompanying "yes" and "no" buttons which may be pressed by the participants. If there are 30 participants, for example, then a majority voting to break for lunch and resume the session afterward can lead the session to be placed on hold for a specified amount of time so that participants may eat lunch.

At step 206, the system correlates, at the processing device, the user input with one or more additional user inputs corresponding to other client devices within the space.

In some embodiments, the correlating is performed based on one or more polling response criteria for a polling question that reconciles user actions to determine a change in function. For example, in various embodiments, the polling response criteria may be that the majority of voters must respond with a particular choice; that the majority of participants present must respond with a particular choice; that ⅓ of voters must respond with a particular choice; that at least one administrator for the session must respond with a particular choice; or any other relevant or suitable criteria for the polling response.

In some embodiments, correlating the user input with the additional user inputs includes: assigning a hierarchical ranking to each of the user input and the additional user inputs, where the correlating is based on at least the hierarchical ranking. In some embodiments, the hierarchy may be pre-specified by an organization the participants are associated with. For example, a company may assign a hierarchical ranking to its employees based on seniority within the company. The rankings of these employees may then have varying weights assigned to them that determine how much effect their user input has in correlating and reconciling multiple user inputs from participants that have been received by the processing device. For example, a manager of an employee may have twice the weight assigned to their user input on whether to enable video in a section of the room they are sitting in than the employee themselves.

In some embodiments, the system assigns a primary role to the client device, and assigns a secondary role to the other client devices. The correlating is then performed such that the user input corresponding to the client device with the primary role overrides the additional user inputs corresponding to the other client devices with the secondary role. In various embodiments, the participant assigned a primary role may be, e.g., an administrator, host, or presenting participant of the communication session, or may be more senior organizationally than other participants within an organization. In some embodiments, the user with the primary role may have control over all aspects of the functionality of the processing device, while client devices assigned to secondary roles get no control or limited control over some functionality. In some embodiments, secondary role client devices may be permitted to control the particular area they are located in, but not the room as a whole. In some embodiments, all users have identical control over all aspects.

In some embodiments, the system further reassigns the primary role from the client device to one or more of the other client devices, and then assigns a secondary role to the client device. Such a reassignment may occur if, for example, a particular participant assigned to a primary role must leave the space, and they wish to confer primary control over the functions within the space to one or more other participants who remain in the space.

In some embodiments, the system assigning the primary role to the client device includes determining that the participant associated with the client device is a currently active participant within the communication session. For example, the system, via the processing device, may detect that a particular participant is in the middle of speaking, and has been presenting material for a certain period of time (e.g., 10 minutes or more). A primary role may be assigned to this user's client device automatically by the system as a result. This may have the effect of providing this presenting user with the ability to, for example, mute certain zones within the space if there is chatter occurring in those zones. In this way, participants may be assigned certain ad hoc privileges over the functionality for the space if they are unexpectedly presenting or especially active within the communication session.

In some embodiments, correlating the user input with the one or more additional user inputs corresponding to the other client devices within the space is based on one or more administrative settings applied by an authorized administrator. For example, an administrator or host of the communication session may be able to access a section of a UI displayed to their client device for configuration of certain settings for the communication session. If such settings relate to the particular user inputs and their proposed changes to functionality for the current communication session, then they may override other participants' user inputs, or have a heavier weight than those user inputs.

In some embodiments, correlating the user input with the one or more additional user inputs corresponding to the other client devices within the space is performed such that all user inputs are given equal precedent with respect to changes in functions indicated by the user inputs. For example, an "egalitarian" setting may be applied by an administrator or host of the communication session, such that all users may be able to openly change any functionality of the processing device that is allowed to be changed by participants with respect to the shared space.

In some embodiments, the change in function requires multiple user inputs indicating the change in function beyond a specified threshold to be applied. The correlating then includes determining whether the specified threshold of user inputs indicating the change of function has been received from at least a subset of the client device and the other client devices. For example, if a majority of participants has indicated a certain user input, then it may be applied, but not if the number of participants indicating the input fail to be a majority. Likewise, if a majority of participants who have provided user inputs relating to a specific functionality request something specific for that functionality, then that specific functionality may be applied. Many such possibilities may be contemplated for specific thresholds to be applied for changes in functions.

At step 208, the system applies the change in function based on the correlation to modify one or more aspects of the communication session.

In some embodiments, applying the change in function includes directing, based on the detected position, one or more parameters of an interconnected camera to be modified with respect to the position of the client device. For example, the parameters of an interconnected camera within the space which can be modified via user input in such a way as described can include one or more of, e.g., changing of viewing angle or perspective of the camera, enabling or disabling of the camera, changing of the particular participant or region of the space the camera is to be focused on, muting or unmuting audio being captured by the camera, changing video quality (e.g., resolution, color space, or other relevant or suitable aspects of video quality), or any other relevant parameters for a camera within the space.

In some embodiments, based on the detected position, the system assigns the client device to an audio zone from a plurality of audio zones within the space. The change in function applied for the current communication session relates to a change in operation for all devices assigned to the audio zone. In various embodiments, such audio zones may be preconfigured, specified by an administrator or host of the session before or during the session, dynamically generated according to one or more criteria (e.g., participants shifting from one side of the room to another with the microphones in the room showing louder audio captured within those regions), or specified in any other suitable way. In some embodiments, only some client devices may be permitted to control devices for particular audio zones, such as client devices assigned a primary role or assigned a higher hierarchical ranking. In some embodiments, the client device's ability to control various functions within the space includes microphone control functions, and the change in operation corresponds to a change applied to the microphone control functions.

In some embodiments, the system notifies the participant of a modification of the one or more aspects of the communication session due to the change in function for tbeing applied. In some embodiments, such a notification can appear as a message within the UI of the participant's client device. In some embodiments where multiple participants provided user inputs, some users may be notified of their user input successfully changing a function, while other users may be notified of their user input failing to be applied.

In some embodiments, the system transmits, from the processing device to the client device, a manifest of available functions. For example, a user may press a button within a UI on their client device marked "help" or "room commands". Upon pressing the button, the processing device can provide the user with all available functions for that particular participant and that particular device. In some embodiments, all functions possible may be presented, but functions which the participant is prohibited from requesting may be greyed out or similarly displayed as unavailable.

Figure 3:
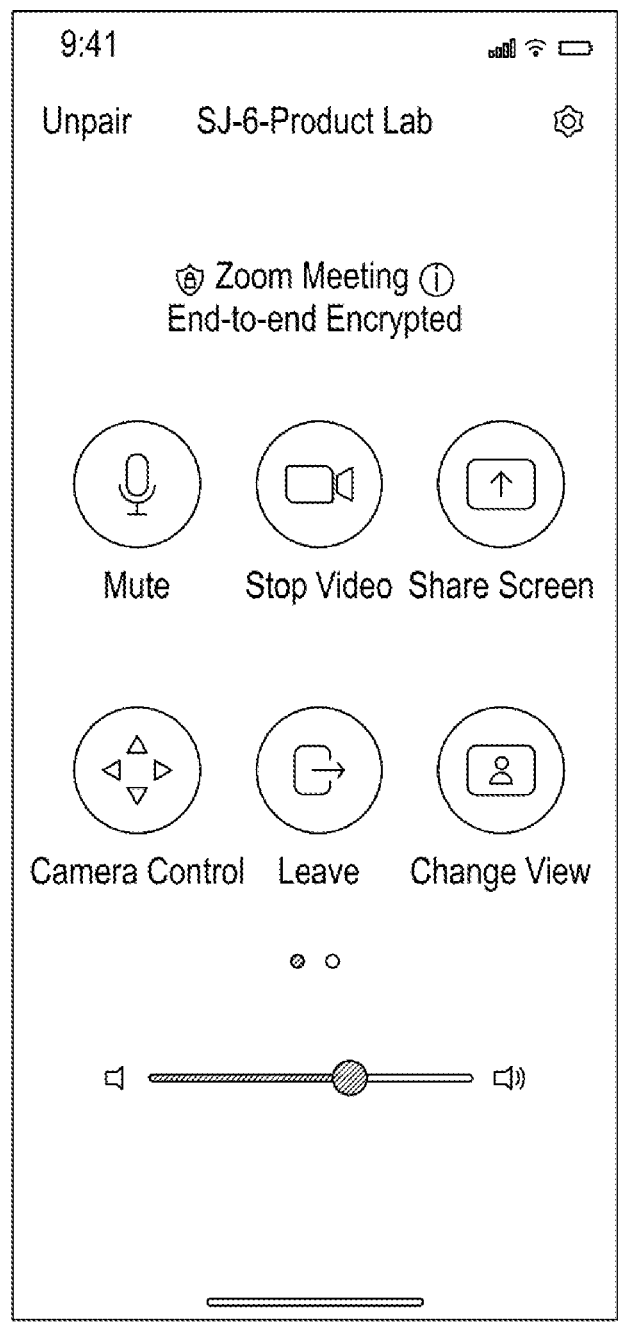
FIG. 3 is a diagram illustrating one example embodiment of a controller application displayed on a client device, in accordance with some embodiments.

FIG. 3 is a diagram illustrating one example embodiment of a controller application displayed on a client device, in accordance with some embodiments.

Within the example, a launched controller application runs on a client device associated with one of the participants of a communication session within a shared space. The controller application provides virtual meeting controls for the communication session in the shared space. In some embodiments, such virtual meeting controls are also available within a processing device that controls aspects of the communication session and/or shared space. In some embodiments, control input from the participant based on respective virtual meeting controls selected on the controller application will bypass the controls of the processing device, and the control input is sent from the controller application instance to the processing device. In various embodiments, one or more of the virtual meeting controls may adjust (e.g., mute) audio data of the virtual meeting and/or video data of the virtual meeting. A virtual meeting control may allow a user of the paired client device to adjust an orientation of a video camera present in the shared space. Another virtual meeting control may further allow the participant associated with the client device to change a virtual meeting view. For example, a current virtual meeting view may be based on a video feed from a video camera present in the shared space, such that a video portraying all the attendees present in the shared space is streamed to the communication session. The participant may select an input to change the view of participants in the shared space by changing a physical orientation of the video camera towards, for example, a whiteboard present in the shared space. The video feed portraying all the participants present in the shared space streamed to the communication session will thereby be replaced with a video feed portraying the whiteboard.

Figure 4:
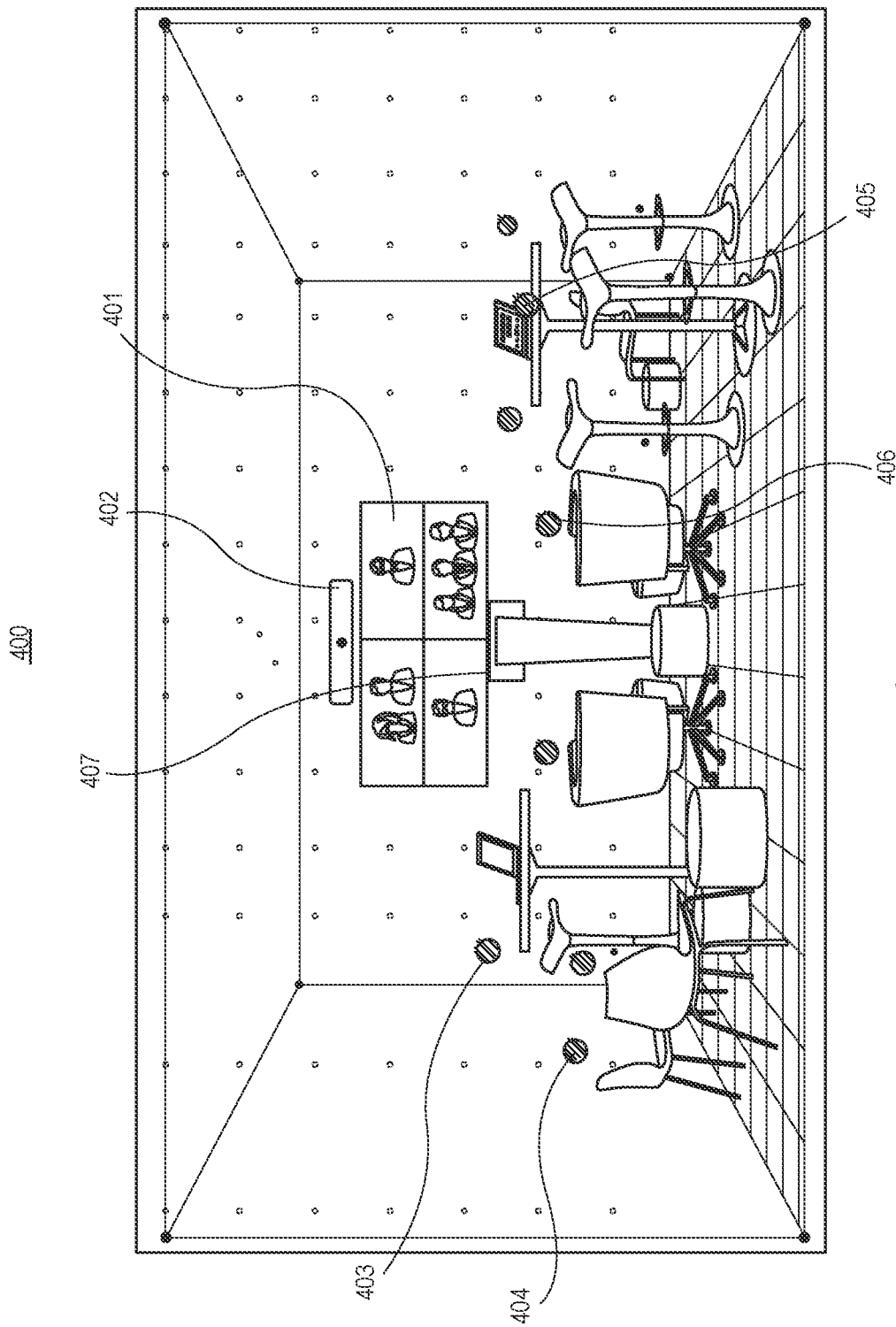
FIG. 4 is a diagram illustrating one example embodiment of a shared space where a communication session is controlled by a processing device, in accordance with some embodiments.

FIG. 4 is a diagram illustrating one example embodiment 400 of a shared space where a communication session is controlled by a processing device, in accordance with some embodiments.

The example embodiment 400 illustrates a shared space which takes the form of a video conferencing room. Within the room, multiple endpoint devices are set up to capture the audio and/or video of video conferencing participants. A monitor 401 is also set up to play audio and/or video from live streams of four other video conference rooms, which are connected remotely within the video conferencing session. The video conference thus includes several people from different remote and local rooms, leading to a hybrid conference meeting composed of far-end and near-end participants.

A number of potential client devices and participant configurations are possible within the depicted setup. First, an overheard video camera 402 captures video as well as audio of the participants from an overheard angle.

Next, a laptop computer 403 sits on a high table on the left side of the room, next to a participant's chair as well as two different lower participants' seats 404. A laptop computer 405 similarly sits on a high table on the right side of the room, with two other chairs with seated participants positioned at the same high table. Two participants are also seated in office chairs toward the front of the room 406. A processing device 407 is placed in the front center of the room. In some embodiments, the processing device 407 is configured to accept control inputs directly on the device itself. The control inputs which may be possible can include, for example, launching or ending the session, muting or unmuting all participants, muting or unmuting individual participants, muting or unmuting specific regions or audio zones of the room, enabling or disabling all cameras or specific cameras within the room, enabling or disabling camera processing functions such as different UIs for each participant in the room and automatic switching between camera angles of a participant, switching a slide of a presentation shown, and more.

The various seated participants within the room may have various ways of individually controlling such aspects other than physically moving to the processing device and providing control input directly on the device itself. For instance, the participant in front of the laptop on the left 403 may be able to control muting or unmuting of the left side of the room on behalf of themselves as well as the two seated participants 404, while the participant controlling the laptop on the right side of the room 405 may mute or unmute the right side of the room on behalf of themselves as well as the two other participants seated at the same table. Similarly, the participants 406 seated toward the front of the room may both individually be able to mute or unmute themselves or disable cameras focused on themselves via each providing control input to a controller application on their respective phones.

One or more of the participants in the room may additionally or alternatively have broader access to control muting and unmuting of microphones for any of the participants in the room, or for specific zones or regions. Many other such possibilities may present themselves for individual or group control of aspects of the shared space within the communication session.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

It will be appreciated that the present disclosure may include any one and up to all of the following examples.

Example 1

A method, comprising: detecting, by a processing device within a space, a client device within the space, the client device being associated with a participant of a current communication session; receiving, at the processing device, a user input corresponding to the client device, the user input indicating a change in function for the current communication session; correlating, at the processing device, the user input with one or more additional user inputs corresponding to other client devices within the space; and applying the change in function based on the correlation to modify one or more aspects of the communication session.

Example 2

The method of Example 1, wherein correlating the user input with the additional user inputs comprises: assigning a hierarchical ranking to each of the user input and the additional user inputs, wherein the correlating is based on at least the hierarchical ranking.

Example 3

The method of any one of Examples 1-2, further comprising: assigning a primary role to the client device; and assigning a secondary role to the other client devices, wherein the correlating is performed such that the user input corresponding to the client device with the primary role overrides the additional user inputs corresponding to the other client devices with the secondary role.

Example 4

The method of any one of Examples 1-3, further comprising: reassigning the primary role from the client device to one or more of the other client devices; and assigning a secondary role to the client device.

Example 5

The method of any one of Examples 1-4, wherein assigning the primary role to the client device comprises determining that the participant associated with the client device is a currently active participant within the communication session.

Example 6

The method of any one of Examples 1-5, further comprising: transmitting, from the processing device to the client device, a manifest of available functions.

Example 7

The method of any one of Examples 1-6, wherein detecting the client device within the space comprises: detecting, by the processing device within the space, a position of the client device within the space.

Example 8

The method of any one of Examples 1-7, wherein applying the change in function comprises: based on the detected position, directing one or more parameters of an interconnected camera to be modified with respect to the position of the client device.

Example 9

The method of any one of Examples 1-8, further comprising: based on the detected position, assigning the client device to an audio zone from a plurality of audio zones within the space, wherein the change in function relates to a change in operation for all devices assigned to the audio zone.

Example 10

The method of any one of Examples 1-9, wherein the client device comprises microphone control functions, and wherein the change in operation corresponds to a change applied to the microphone control functions.

Example 11

The method of any one of Examples 1-10, wherein detecting the client device within the space comprises: determining that the participant associated with the client device is scheduled to attend the communication session.

Example 12

The method of any one of Examples 1-11, further comprising: detecting, via the processing device, biometric data of a participant in the space; detecting one or more behaviors of the participant within the space based on the biometric data of the participant; and based on the one or more behaviors of the participant, associating the participant with a particular zone of the space, wherein the space comprises a plurality of zones.

Example 13

A communication system comprising one or more processors configured to perform the operations of: detecting, by a processing device within a space, a client device within the space, the client device being associated with a participant of a current communication session; receiving, at the processing device, a user input corresponding to the client device, the user input indicating a change in function for the current communication session; correlating, at the processing device, the user input with one or more additional user inputs corresponding to other client devices within the space; and applying the change in function based on the correlation to modify one or more aspects of the communication session.

Example 14

The system of Example 13, wherein correlating the user input with the additional user inputs comprises: assigning a hierarchical ranking to each of the user input and the additional user inputs, wherein the correlating is based on at least the hierarchical ranking.

Example 15

The system of any one of Examples 13-14, further comprising the operations of: assigning a primary role to the client device; and assigning a secondary role to the other client devices, wherein the correlating is performed such that the user input corresponding to the client device with the primary role overrides the additional user inputs corresponding to the other client devices with the secondary role.

Example 16

The system of any one of Examples 13-15, further comprising the operations of: reassigning the primary role from the client device to one or more of the other client devices; and assigning a secondary role to the client device.

Example 17

The system of any one of Examples 13-16, wherein assigning the primary role to the client device comprises determining that the participant associated with the client device is a currently active participant within the communication session.

Example 18

The system of any one of Examples 13-17, further comprising the operations of: transmitting, from the processing device to the client device, a manifest of available functions.

Example 19

The system of any one of Examples 13-18, wherein detecting the client device within the space comprises: detecting, by the processing device within the space, a position of the client device within the space.

Example 20

The system of any one of Examples 13-19, wherein applying the change in function comprises: based on the detected position, directing one or more parameters of an interconnected camera to be modified with respect to the position of the client device.

Example 21

The system of any one of Examples 13-20, further comprising the operations of: based on the detected position, assigning the client device to an audio zone from a plurality of audio zones within the space, wherein the change in function relates to a change in operation for all devices assigned to the audio zone.

Example 22

The system of any one of Examples 13-21, wherein the client device comprises microphone control functions, and wherein the change in operation corresponds to a change applied to the microphone control functions.

Example 23

The system of any one of Examples 13-22, wherein detecting the client device within the space comprises: determining that the participant associated with the client device is scheduled to attend the communication session.

Example 24

The system of any one of Examples 13-23, further comprising: detecting, via the processing device, biometric data of a participant in the space; detecting one or more behaviors of the participant within the space based on the biometric data of the participant; and based on the one or more behaviors of the participant, associating the participant with a particular zone of the space, wherein the space comprises a plurality of zones.

Example 25

A non-transitory computer-readable medium containing instructions for the operations of: detecting, by a processing device within a space, a client device within the space, the client device being associated with a participant of a current communication session; receiving, at the processing device, a user input corresponding to the client device, the user input indicating a change in function for the current communication session; correlating, at the processing device, the user input with one or more additional user inputs corresponding to other client devices within the space; and applying the change in function based on the correlation to modify one or more aspects of the communication session.

Example 26

The non-transitory computer-readable medium of Example 25, wherein correlating the user input with the additional user inputs comprises: assigning a hierarchical ranking to each of the user input and the additional user inputs, wherein the correlating is based on at least the hierarchical ranking.

Example 27

The non-transitory computer-readable medium of any one of Examples 25-26, further comprising the operations of: assigning a primary role to the client device; and assigning a secondary role to the other client devices, wherein the correlating is performed such that the user input corresponding to the client device with the primary role overrides the additional user inputs corresponding to the other client devices with the secondary role.

Example 28

The non-transitory computer-readable medium of any one of Examples 25-27, further comprising the operations of: reassigning the primary role from the client device to one or more of the other client devices; and assigning a secondary role to the client device.

Example 29

The non-transitory computer-readable medium of any one of Examples 25-28, wherein assigning the primary role to the client device comprises determining that the participant associated with the client device is a currently active participant within the communication session.

Example 30

The non-transitory computer-readable medium of any one of Examples 25-29, further comprising the operations of: transmitting, from the processing device to the client device, a manifest of available functions.

Example 31

The non-transitory computer-readable medium of any one of Examples 25-31, wherein detecting the client device within the space comprises: detecting, by the processing device within the space, a position of the client device within the space.

Example 32

The non-transitory computer-readable medium of any one of Examples 25-31, wherein applying the change in function comprises: based on the detected position, directing one or more parameters of an interconnected camera to be modified with respect to the position of the client device.

Example 33

The non-transitory computer-readable medium of any one of Examples 25-32, further comprising the operations of: based on the detected position, assigning the client device to an audio zone from a plurality of audio zones within the space, wherein the change in function relates to a change in operation for all devices assigned to the audio zone.

Example 34

The non-transitory computer-readable medium of any one of Examples 25-33, wherein the client device comprises microphone control functions, and wherein the change in operation corresponds to a change applied to the microphone control functions.

Example 35

The non-transitory computer-readable medium of any one of Examples 25-34, wherein detecting the client device within the space comprises: determining that the participant associated with the client device is scheduled to attend the communication session.

Example 36

The non-transitory computer-readable medium of any one of Examples 25-35, further comprising: detecting, via the processing device, biometric data of a participant in the space; detecting one or more behaviors of the participant within the space based on the biometric data of the participant; and based on the one or more behaviors of the participant, associating the participant with a particular zone of the space, wherein the space comprises a plurality of zones.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
    detecting, by a processing device within a space, a client device within the space, the client device being associated with a participant of a current communication session;
    receiving, at the processing device, a user input corresponding to the client device, the user input indicating a change in function for the current communication session;
    correlating, at the processing device, the user input with one or more additional user inputs corresponding to other client devices within the space; and
    applying the change in function based on the correlation to modify one or more aspects of the communication session.

2. The method of claim 1, wherein correlating the user input with the additional user inputs comprises:
    assigning a hierarchical ranking to each of the user input and the additional user inputs,
    wherein the correlating is based on at least the hierarchical ranking.

3. The method of claim 1, further comprising:
    assigning a primary role to the client device; and
    assigning a secondary role to the other client devices,
    wherein the correlating is performed such that the user input corresponding to the client device with the primary role overrides the additional user inputs corresponding to the other client devices with the secondary role.

4. The method of claim 3, further comprising:
    reassigning the primary role from the client device to one or more of the other client devices; and
    assigning a secondary role to the client device.

5. The method of claim 3, wherein assigning the primary role to the client device comprises determining that the participant associated with the client device is a currently active participant within the communication session.

6. The method of claim 1, further comprising:
    transmitting, from the processing device to the client device, a manifest of available functions.

7. The method of claim 1, wherein detecting the client device within the space comprises:
    detecting, by the processing device within the space, a position of the client device within the space.

8. The method of claim 7, wherein applying the change in function comprises:
    based on the detected position, directing one or more parameters of an interconnected camera to be modified with respect to the position of the client device.

9. The method of claim 7, further comprising:
    based on the detected position, assigning the client device to an audio zone from a plurality of audio zones within the space,
    wherein the change in function relates to a change in operation for all devices assigned to the audio zone.

10. The method of claim 9, wherein the client device comprises microphone control functions, and wherein the change in operation corresponds to a change applied to the microphone control functions.

11. The method of claim 1, wherein detecting the client device within the space comprises:
    determining that the participant associated with the client device is scheduled to attend the communication session.

12. The method of claim 1, further comprising:
    detecting, via the processing device, biometric data of a participant in the space;
    detecting one or more behaviors of the participant within the space based on the biometric data of the participant; and
    based on the one or more behaviors of the participant, associating the participant with a particular zone of the space, wherein the space comprises a plurality of zones.

13. A communication system comprising one or more processors configured to perform the operations of:
    detecting, by a processing device within a space, a client device within the space, the client device being associated with a participant of a current communication session;
    receiving, at the processing device, a user input corresponding to the client device, the user input indicating a change in function for the current communication session;
    correlating, at the processing device, the user input with one or more additional user inputs corresponding to other client devices within the space; and
    applying the change in function based on the correlation to modify one or more aspects of the communication session.

14. The communication system of claim 13, wherein correlating the user input with the one or more additional user inputs corresponding to the other client devices within the space is based on one or more administrative settings applied by an authorized administrator.

15. The communication system of claim 13, wherein correlating the user input with the one or more additional user inputs corresponding to the other client devices within the space is performed such that all user inputs are given equal precedent with respect to changes in functions indicated by the user inputs.

16. The communication system of claim 13, the one or more processors being further configured to perform the operation of:
notifying the participant of a modification of the one or more aspects of the communication session due to the change in function being applied.

17. The communication system of claim 13, wherein the user input is recognized as a custom user input defined by the participant.

18. The communication system of claim 13, wherein the user input and the additional user inputs are received in response to a notification comprising a polling question, and wherein the correlating is performed based on one or more polling response criteria.

19. The communication system of claim 13, wherein the change in function requires a plurality of user inputs indicating the change in function beyond a specified threshold to be applied, and wherein the correlating comprises determining whether the specified threshold of user inputs indicating the change of function has been received from at least a subset of the client device and the other client devices.

20. A non-transitory computer-readable medium containing instructions for generating a note with session content from a communication session, comprising:

instructions for detecting, by a processing device within a space, a client device within the space, the client device being associated with a participant of a current communication session;

instructions for receiving, at the processing device, a user input corresponding to the client device, the user input indicating a change in function for the current communication session;

instructions for correlating, at the processing device, the user input with one or more additional user inputs corresponding to other client devices within the space; and instructions for applying the change in function based on the correlation to modify one or more aspects of the communication session.

* * * * *